(12) United States Patent
Baumer et al.

(10) Patent No.: US 7,018,670 B2
(45) Date of Patent: Mar. 28, 2006

(54) METHOD AND APPARATUS FOR PRODUCING PARTICLES OF A FOODSTUFF

(75) Inventors: Johannes Baumer, Lontzen (DE); Jürgen Becker, Herzogenrath (DE); Dietmar Otte, Aachen (DE); Dieter Stauber, Herzogenrath (DE)

(73) Assignee: Franz Zentis GmbH & Co., (DE)

( * ) Notice: Subject to any disclaimer, the term of this patent is extended or adjusted under 35 U.S.C. 154(b) by 456 days.

(21) Appl. No.: 10/122,426

(22) Filed: Apr. 12, 2002

(65) Prior Publication Data

US 2002/0176919 A1    Nov. 28, 2002

(30) Foreign Application Priority Data

Apr. 14, 2001    (DE) ................. 101 18 700

(51) Int. Cl.
    *A23P 1/00*    (2006.01)
(52) U.S. Cl. ............. 426/660; 426/515; 426/521; 426/524
(58) Field of Classification Search .......... 426/515, 426/524, 518, 521, 385, 660
    See application file for complete search history.

(56) References Cited

U.S. PATENT DOCUMENTS

| | | | |
|---|---|---|---|
| 3,737,328 A | | 6/1973 | Schumann |
| 4,107,938 A | * | 8/1978 | Sollich ................. 62/71 |
| 4,929,456 A | | 5/1990 | Bejarano-Wallens et al. |
| 6,000,229 A | | 12/1999 | Jones et al. |
| 6,217,927 B1 | * | 4/2001 | Suttle et al. ............. 426/515 |
| 6,419,970 B1 | * | 7/2002 | Willcocks et al. ........ 426/524 |
| 6,635,295 B1 | * | 10/2003 | Horigane ................ 426/385 |

FOREIGN PATENT DOCUMENTS

| | | |
|---|---|---|
| EP | 0 332 287 A1 | 9/1989 |
| EP | 0 617 248 A1 | 9/1994 |
| EP | 0 974 275 A1 | 1/2000 |
| EP | 0 974 275 B1 | 1/2000 |
| EP | 0 976 333 A2 | 2/2000 |
| EP | 0 976 333 A3 | 2/2000 |
| EP | 0 998 854 A1 | 5/2000 |
| EP | 1 121 867 A1 | 8/2001 |
| EP | 1 149 536 A1 | 10/2001 |

(Continued)

OTHER PUBLICATIONS

Justin J. Alikonis, Candy Technology, 1979, AVI Publishing Co., pp. 15-24.*

*Primary Examiner*—Drew Becker
(74) *Attorney, Agent, or Firm*—Boyle Fredrickson Newholm Stein & Gratz S.C.

(57) ABSTRACT

An apparatus for and a method of producing particles of a foodstuff is provided. A liquid form of a sterilized or pasteurized foodstuff is deposited in the form of a film or a strip on a surface of a rotating cooling roller or cooling belt. The foodstuff is then detached in an at least partly hardened form from the surface of the cooling roller or belt for comminution to the desired particle size. In order to maintain the production of sterilized or pasteurized foodstuff particles, charging and at least partly the hardening of the sterilized or pasteurized foodstuff occurs within an enclosed sterilizable or pasteurizable vessel, and the surface of and the gas surrounding the cooling roller or the cooling belt in the zone of the charging of the foodstuff is lower than 0 ° C.

15 Claims, 5 Drawing Sheets

FOREIGN PATENT DOCUMENTS

| | | |
|---|---|---|
| FR | 2 602 832 | 2/1988 |
| FR | 2 638 066 | 4/1990 |
| GB | 351132 A | 6/1931 |
| GB | 736010 A | 8/1955 |
| GB | 956933 | 4/1964 |
| GB | 2 023 789 A | 1/1980 |
| GB | 1581030 | * 12/1980 |
| JP | 01042211 | 2/1989 |

* cited by examiner

METHOD AND APPARATUS FOR PRODUCING PARTICLES OF A FOODSTUFF

BACKGROUND OF THE INVENTION

The invention relates to a method for producing particles of a foodstuff, having a fat content of between 50% and 90%, a sugar content of not more than 20% and a water content of not more than 10%, with the foodstuff which is present in liquid form being applied in the form of a film or strip onto the surface of a rotating cooling roller or a moved cooling belt and thereafter there being a detachment of the at least partly hardened foodstuff from the surface of the cooling roller or the cooling belt, with there being a comminution to the desired particle size in the case of the production of an endless film or endless strip after the hardening of the foodstuff. The invention further relates to an apparatus for performing such a method.

It is generally known in methods for producing chocolate particles to apply the chocolate at a temperature of approx. 30° C. to 40° C. onto a cooled surface at first in the form of a cooling roller. The surface temperature of the cooling roller is at the moment of contact with the liquid chocolate approximately 5° C. to 10° C. With the help of a calibrating roller the thickness of the chocolate film forming on the cooling roller can be set. After applying the chocolate onto the cooling roller, a crystallization of the chocolate in the form of a thin layer occurs at first in the zone of the contact surface. Furthermore, starting from the surface of the chocolate film which is averted from the cooling roller there is a commencing crystallization as a result of the convective heat transmission to the ambient gaseous medium which occurs there, with the temperature of the gaseous medium being at 10° C. to 20° C.

The chocolate film leaves the cooling roller in the known method in a state which is crystallized only from the edges, i.e. only in a partial manner, and is therefore placed on the surface of a cooling belt which is led through a cooling tunnel which has a length of approx. 10 to 30 meters. Cold air is guided through the cooling tunnel in a counter-flow, which air has a temperature of approx. 10° C. to 15° C.

The relevant aspect in the production of high-quality chocolate particles is the adherence to certain predetermined values during the cooling process of the chocolate. The temperature gradient must not exceed a certain amount, as otherwise an undesirable crystal structure of the end product is obtained. The desired structure of the fat crystals can only be obtained by cooling with a very low temperature gradient, which structure provides the hardened chocolate with the desired gloss and the desired resistance to fat bloom formation. Due to the low temperature gradients there are high passage times through the cooling stretches, which with respect to the thus arising minimum transport speeds of the chocolate to be hardened, leads to relatively large constructional dimensions of the cooling stretches. The spatial requirements for apparatuses which operate according to the state of the art are thus very high, which then again entails high investment and operating costs during the operation.

In the recent past the demand has increasingly arisen in the users of such chocolate particles to also use such particles in aqueous non-frozen media such as yoghurts or sweet desserts. In order to avoid problems with microbiology even after a certain storage period, it is necessary to strive towards the lowest possible number of germs in the chocolate. Since raw cocoa naturally has a relatively high germ infestation which is harmless in the processing of the chocolate, the reduction of germs of the liquid chocolate by pasteurization or sterilization is necessary. The goal of chocolate particles with low germ infestation can only be achieved when a subsequent new infestation with germs can be prevented after the formation of the particles. In the methods according to the state of the art and the pertinent apparatuses with their considerable constructional sizes it is hardly possible to ensure low germ infestation or even freedom from germ infestation with economically viable measures. Thus it is not cost effective to perform the entire formation of particles under clean room conditions as is conventionally applied in the pharmaceutical business.

An alternative method for producing particles of a foodstuff is known from EP 0 976 333 A2. Here there is a dripping of liquid foodstuff in a stock of nozzles, whereupon the drops cover a drop path within a drop tower of a height of approx. 10 to 15 m. A cooling gas is guided in a counter-stream to the falling foodstuff particles through the drop tower. At the end of the drop path the foodstuff particles are hardened at least to such an extent that they are no longer plastically deformable when hitting the surface. If the foodstuff is supplied in a sterilized or pasteurized form during the dripping, it is possible to produce sterile or pasteurized particles if the drop tower was also sterilized or pasteurized prior to commencement of the production. The disadvantageous aspect of the known method is on the one hand the relatively low production capacity and on the other hand the high constructional complexity, especially the mandatory large extension in the vertical direction.

The invention is based on the object of improving a method of the kind mentioned above in such a way that the production of pasteurized or sterilized foodstuff particles is enabled in a cost-effective manner.

Based on a method of the kind mentioned above, this object is achieved in accordance with the invention in such a way that the saturation or charging and at least partial hardening the foodstuff which is present in liquid, sterilized or pasteurized form is made within an inclosed sterilizable or pasteurizable vessel and the surface of the cooling roller or the cooling belt is in the zone of the charging of the foodstuff lower than 0° C. and/or the temperature of a gas surrounding the cooling roller or cooling belt in the zone of charging of the foodstuff is lower than 0° C.

Due to the very low surface temperature of the cooling roller or the cooling belt and/or the very low ambient temperature, it is possible to achieve a very rapid cooling of the foodstuff with the method in accordance with the invention. The temperature gradients are substantially higher as are realized according to the state of the art. This leads to the consequence that crystal structures are obtained in the hardened particles which differ from those as are desirable in classic chocolate or classic cocoa-containing fat compositions. Although this leads to the consequence that the surface of the particles as produced according to the invention becomes dull and matt, this property need not be regarded as disadvantageous in cases when the foodstuff particles are to be used in an aqueous non-frozen medium. Once the particles are wetted with a liquid film, they appear as glossy to the viewer as conventionally produced particles which also have this gloss in the "dry" state. A particularly preferable case of application of the foodstuff particles produced according to the invention is therefore the use in conjunction with aqueous non-frozen media such as fruit preparations for yoghurts or other acidulated milk products or also for the use in sweet desserts such as pudding, mousse or the like.

SUMMARY OF THE INVENTION

The obtained high temperature gradient in the method according to the invention allows for very short cooling periods, which again leads to the considerable advantage that apparatuses for performing the method in accordance with the invention have a very low structural dimension in comparison with conventional apparatuses. It is this small size that allows the economically viable production of foodstuff particles of low germ infestation, especially such that are pasteurized or sterilized, as is mandatory for the preferred use of the particles in conjunction with aqueous media for achieving satisfactory microbiological properties. It is only the small size of the cooling roller or the cooling belt or a combination of the two components that allows charging and at least partly hardening the foodstuff in an enclosed, sterilizable or pasteurizable vessel. Only with the help of such an encapsulation is it possible to permanently ensure a production occurring under sterile conditions within a pressure vessel for example without requiring clean room conditions for this purpose in the entire ambient environment of the apparatus as used for performing the method. As a result, the enclosed vessel within which the charging and at least partial hardening of the foodstuff occurs can be pasteurized or sterilized in a conventional manner with comparably low efforts prior to the commencement of the production. As a result of the isolation of the production process within the vessel it is not necessary to fear any renewed germ infestation during the ongoing production as long as the liquid foodstuff to be formed is used in a sterilized or pasteurized form.

The method in accordance with the invention thus allows for the first time the cost-effective production of pasteurized or sterilized foodstuff particles as are mandatory for the use in aqueous media due to the microbial requirements. Even if such particles do not show certain properties of conventionally produced foodstuff particles, and chocolate particles in particular, due to the rapid cooling speed, such departing properties are not disadvantageous especially in view of the preferred purpose of the particles. Particularly advantageous is the low need for space of an apparatus suitable for performing the method in accordance with the invention, because only in this way is it possible to ensure a cost-effective production under sterile conditions.

The cooling speed can be increased even further and thus the required constructional space can be reduced even further if the surface of the cooling roller or the cooling belt is in the zone of the charging of the foodstuff lower than $-20°$ C., preferably lower than $-50°$ C., and/or the temperature of a gas surrounding the cooling roller or cooling belt is lower than $-20°$ C., preferably lower than $-50°$ C. In this case it is possible that the hardening of the foodstuff occurs substantially completely already on a cooling roller with acceptable diameter, so that a subsequent cooling belt can be omitted entirely, if so desired.

In a further development of the invention it is proposed that the layer thickness of the film applied to a cooling roller or the strip applied to a cooling roller is set by changing the temperature of the supplied liquid foodstuff. An appropriate option is especially the use of a charging hopper which is attached to the outside surface or jacket of the cooling roller and on which a bath of liquid foodstuff extending over the entire width of the cooling roller will adjust Due to the low temperature of the surface of the cooling roller, a film or strip of foodstuff is dragged or entrained from said bath, because the crystallization of a thin layer occurs on the roller surface. Depending on the viscosity of the liquid foodstuff; i.e. depending on its temperature, a more or less thick, semi-liquid or liquid layer adheres to the crystallized layer which is conveyed away from the bath due to the rotation of the roller and hardens further due to the additional convective heat transmission on the surface averted from the cooling roller and due to further thermal conduction into the cooling roller, until said layer is substantially fully crystallized out.

According to an embodiment of the invention, the foodstuff comprises a content of cocoa butter of not less than 50%. Preferably, the foodstuff concerns chocolate in which a minimum sugar content of 3% is prescribed by law.

A further development of the invention is that the interior chamber of a vessel is flowed through by a cooling gas. The convective heat transmission to the surface of the foodstuff film or foodstuff strip which is averted from the roller jacket or cooling belt is thus increased considerably. Nitrogen, carbon dioxide, argon or air can be used as the cooling gas.

In order to prevent any entrainment of the formed foodstuff particles by the cooling gas against the conveying direction of the same within the vessel, it is appropriate to guide the cooling gas in a co-current flow to the direction of movement of the foodstuff through the enclosed vessel.

In order to keep the operating costs low when expensive cooling gases are used and to minimize energy losses, the cooling gas should be guided at least partly in a circulation.

The object on which the invention is based is also achieved by an apparatus for producing particles of a foodstuff comprising a fat content of between 50% and 90%, a sugar content of not more than 20% and a water content of not more than 10%, with the foodstuff present in liquid form being applicable by means of a dosing device in the form of a film or in the form of a strip onto the surface of a rotating cooling roller and thereafter the detachment of the at least partly hardened foodstuff occurring from the cooling roller and with a comminution to the desired particle size being performable in the case of a film or endless strip after the crystallization, with the liquid foodstuff being present in accordance with the invention upon its supply to the cooling roller in a sterilized or pasteurized form, with the cooling roller having an interior hollow space which can be flowed through by the same cooling medium which encloses the outside surface of the cooling roller, with the apparatus being encapsulated entirely in a sterilizable or pasteurizable vessel, and with further the foodstuff being substantially fully crystallizable on the cooling roller.

As a result of the completely encapsulated arrangement of the apparatus, the same can be pasteurized or sterilized with ease prior to the start of the production, so that in the case of charging a pasteurized or sterilized foodstuff, production can be performed under sterile conditions with comparably low effort. As a result of the substantially complete crystallization of the foodstuff on the cooling roller, it is possible to omit an additional cooling belt which is provided downstream of the cooling roller, thus reducing the required size as compare with conventional apparatuses and enabling an encapsulated housing (especially a pressure- tight vessel) in an economically viable way. The high cooling speeds which are required during a complete hardening on the cooling roller are enabled by to flow through the inner hollow space of the cooling roller with the same cooling medium which encloses the outside surface of the cooling roller and thus ensures a convective heat transmission with the surface of the foodstuff film or foodstuff strip which is averted from the cooling surface. In contrast to a flow of the cooling roller by a cooling sole or bottom chiller as is common practice according to the state of the art, it is possible to achieve higher heal transmissions with the help of a cross-flow by means of a gaseous medium with respectively low temperatures, especially when the wall thickness of the cooling roller is very low. Moreover, the constructional complexity of the apparatus in accordance with the invention decreases by using a single cooling medium both for the interior as well as for the ambient environment of the cooling roller.

Preferably, the cooling roller is flowed through axially by the cooling medium. The dosing device can be designed in a comparably simple way in the form of a charging hopper for example which extends over the width of the cooling roller and comprises a bath of liquid foodstuff which forms therein when the liquid foodstuff can be applied in a zone from the dosing device onto the cooling roller in which the speed vector which is associated with one point on the roller surface is provided with a component which is opposite of gravity. In this case, a respectively thicker film which depends on the viscosity of the foodstuff is simultaneously guided out of the bath of the foodstuff by the crystallization of a thin film on the roller surface without needing any mechanical means such as a calibrating roller for example for regulating the layer thickness.

Since especially at temperatures of the roller surface of less than −10° C. there is no adherence of the liquid foodstuff but instead a kind of "beading" effect, it is further proposed in accordance with the invention that the surface of the cooling roller which comes into contact with the liquid foodstuff is provided with recesses of a depth of between 0.1 mm and 0.5 mm. In such a roughened surface it is possible to ensure the adherence of the liquid foodstuff even at very low surface temperatures.

It is provided in a further development of the invention that the cooling roller is provided with a ribbing which extends parallel to the rotational axis of the cooling roller and is provided in its cross section with a division of 3 mm to 10 mm. Such a ribbing extending in the longitudinal direction can be produced in a simple manner with the help of milling of the cooling roller.

Finally, a preferable further development of the invention is that the vessel is pressure-tight up to at least 2 bars, preferably up to 3 bars, with each thereof being measured absolutely. In this way, the temperatures required for sterilization can be kept comparably low, so that plastic materials as are required for sealing purposes are not damaged.

BRIEF DESCRIPTION OF THE DRAWINGS

The method in accordance with the invention is explained in closer detail by reference to an embodiment suitable for its performance which is shown in the drawings, wherein.

DETAILED DESCRIPTION OF THE INVENTION

Figure 1:
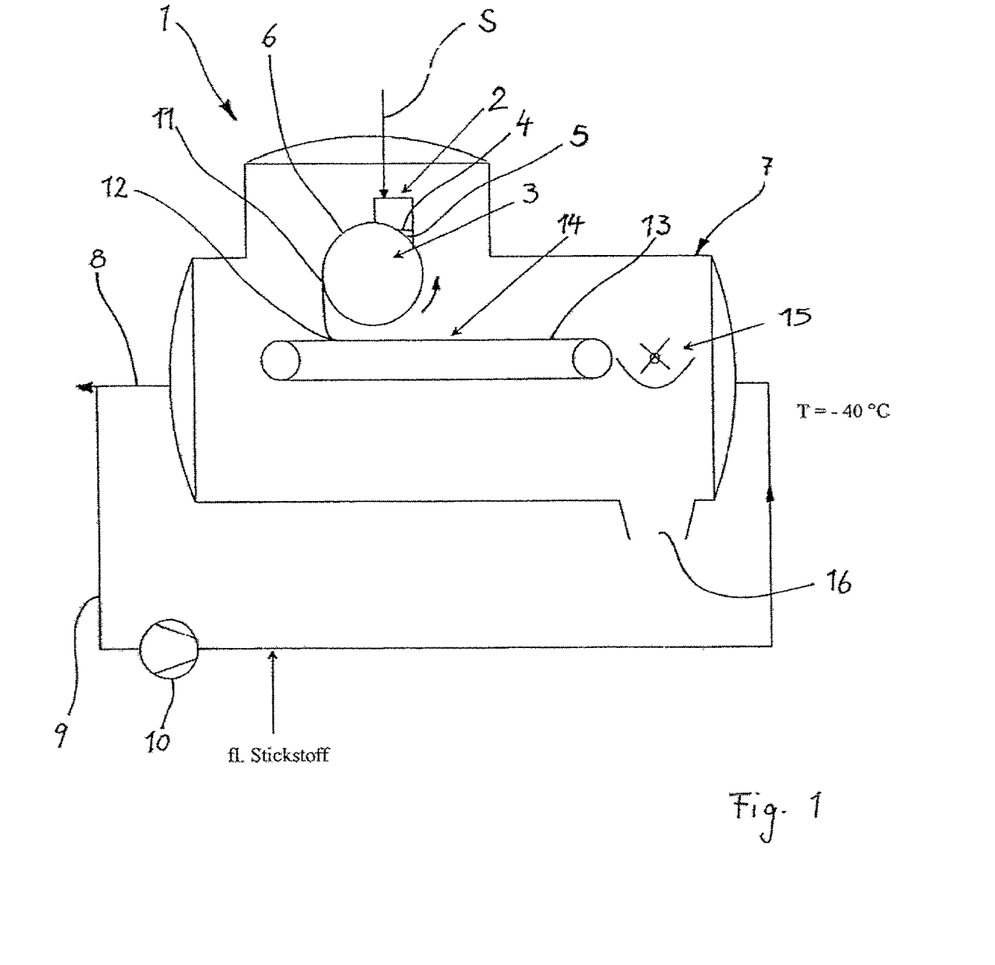
FIG. 1 shows a schematic sectional view through an apparatus with a cooling roller, a cooling belt and a comminution device and a partial circulatory guidance of the gaseous medium.

An apparatus 1 as schematically shown in FIG. 1 for producing particles of a foodstuff, especially chocolate particles, is provided with a heated dosing device 2 with which an endless film of the chocolate can be applied onto the cooling roller 3, with the chocolate being present in liquid form in said dosing device 2. The chocolate is sterilized first in batches and is thereafter supplied continuously through a feed line S to the dosing device 2, within which a liquid level 4 of a bath 5 is formed which extends substantially over the entire width of the cooling roller 3. The temperature of the chocolate within the bath 5 is between 50° C. and 60° C. The thickness of the chocolate film being formed on the cooling roller 3 can be regulated by way of changing the charging temperature. The layer thickness is approx. 0.3 to 2 mm.

The temperature of the outer surface 6 of the cooling roller 3 is approx. −50° C., so that a cooling of the chocolate film occurs with a comparably high temperature gradient and a crystallized layer forms rapidly on the surface 6 of the cooling roller 3. The circumferential speed of the rotating cooling roller 3 is approx. 0.1 to 20 meters per minute depending on the roller diameter, the charging temperature of the liquid chocolate and the surface temperature of the cooling roller and the ambient temperature.

Apparatus 1 further comprises an enclosed, pressure-tight, boiler-like receptacle 7 which prior to starting the production allows a pasteurization or sterilization of the entire components enclosed by receptacle 7 with super-heated steam (p>2 bars, T>125° C.). As an alternative to the sterilization with superheated steam it is also principally possible to sterilize with hot air. Since the temperatures need to be higher than 180° C. in this case, the use of sealing materials made of plastic is only possible in a very restricted way.

The receptacle 7 is flowed through in counter-flow by nitrogen with a temperature of approx. −40° C. in the feed zone. With the help of suitable guide devices (not shown) it is ensured that the cooling gas flows through the interior space of the cooling roller 3 in the axial direction. The temperature of the cooling gas in the zone of the feed of the liquid chocolate onto the cooling roller 3 is approx. −35° C.

The cooling gas is partly conducted in a circulation, with a partial volume flow being branched off from an exhaust line 8 to a return line 9 in which a compressor 10 is disposed. Liquid nitrogen is injected into the return line 9 after the compressor 10, so that a return cooling of the nitrogen gas to −40° C. occurs as a result of the evaporation cooling before the return to the receptacle 7. In order to reduce heat loss, both the return line 9 as well as the receptacle 7 are insulated; the latter with the help of vacuum insulation.

The only partly hardened chocolate film leaves the cooling roller 3 at the location 11 in order to be transferred to a revolving cooling belt 14 at location 12 on the surface 13. The surface temperature of the cooling belt is approx. −40° C. at the transfer location, so that subsequently a further cooling of the foodstuff film occurs. As also in the zone of the cooling roller 3, heat transmission occurs by way of thermal conduction to the cooling belt 14 which is flowed through internally by a cooling sole on the one hand and by way of convection with the nitrogen gas flowing through the receptacle 7 on the other hand.

When the chocolate film leaves the cooling belt 13, the chocolate is completely crystallized and reaches a comminution device 15 in which the film is broken down by crusher rollers into chocolate particles of the desired size.

Whereas the thickness of the film is approx. 0.3 to 2 mm, the length and width dimensions of the particles are in the range of 3 mm to 15 mm. The chocolate particles leave the receptacle 7 by a funnel-like outlet opening 16 which is connected to a conduit for further transport of the particles.

Figure 2:
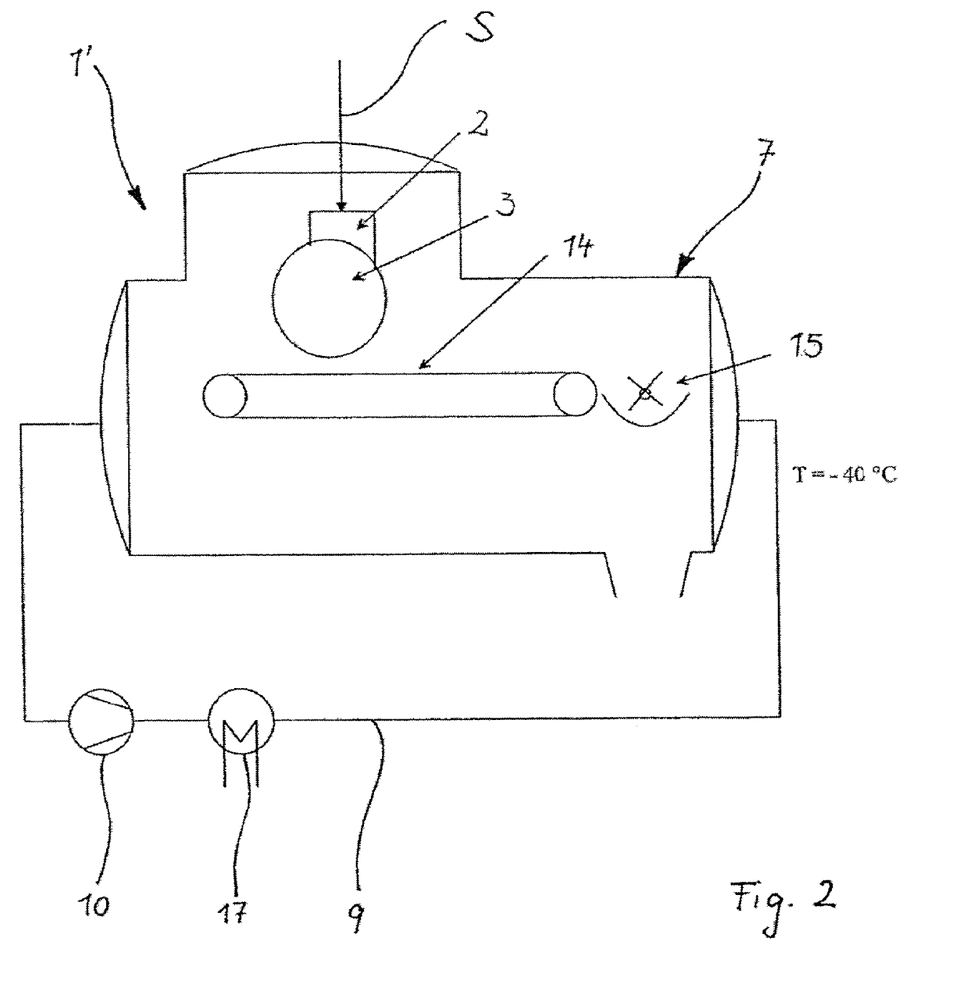
FIG. 2 shows a representation as in FIG. 1, but with a complete circulatory guidance of the cooling medium.

The apparatus 1' according to *fig.* 2 differs in such a way from the apparatus 1 according to FIG. 1 that the guidance of the nitrogen gas occurs completely in a circulation. Behind the compressor 10 a heat exchanger 17 is integrated in the return line 9 for this purpose, which heat exchanger reverses the temperature increase of the nitrogen gas due to cooling of the liquid chocolate. The supply of the gaseous nitrogen to the receptacle 7 occurs in this case too at approx. −40° C. The nitrogen gas leaves the receptacle at a temperature of approx. −35° C.

Figure 3:
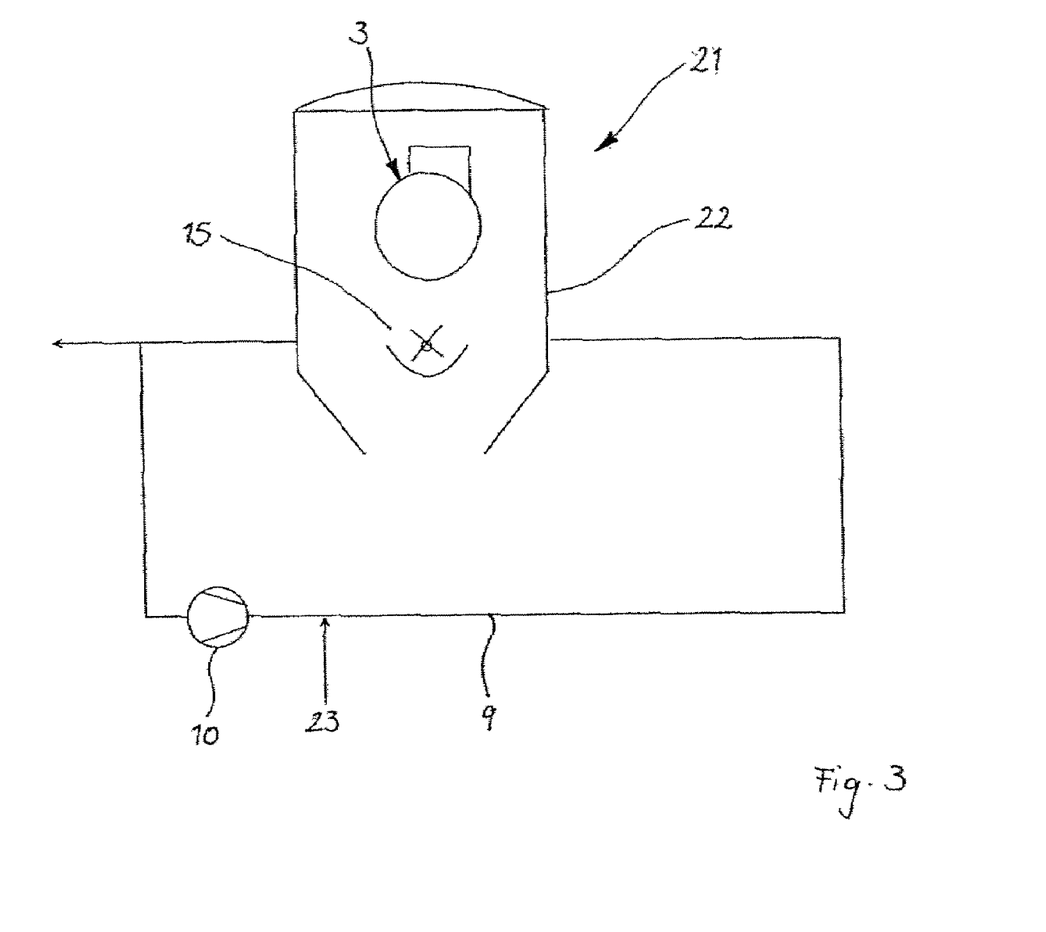
FIG. 3 shows a representation as in FIG. 1, but without the cooling belt.

An apparatus 21 as illustrated in FIG. 3 comprises merely one cooling roller 3 for cooling the liquid foodstuff, which cooling roller is provided downstream with a comminution device 15. The complete crystallization of the liquid chocolate occurs here merely on the surface of cooling roller 3 without requiring any after-crystallization on a cooling belt. The surface temperature of the cooling roller 3 in the zone of the first contact with the liquid foodstuff is in this case approx. −50° C., which is why the temperature of the gaseous nitrogen is approx. −55° C. on its entrance into receptacle 22 which is also configured in a pressure-tight way. When leaving the receptacle 22 the temperature of the nitrogen gas is approx. −50° C. In the apparatus 21 as shown in FIG. 3, the guidance of the nitrogen gas occurs only partly in a circulation, so that a portion of the heated nitrogen gas needs to be discharged as waste gas. There is an injection of liquid nitrogen for re-cooling behind the compressor 10 within the return line 9 at the location marked with the arrow 23.

Figure 4:
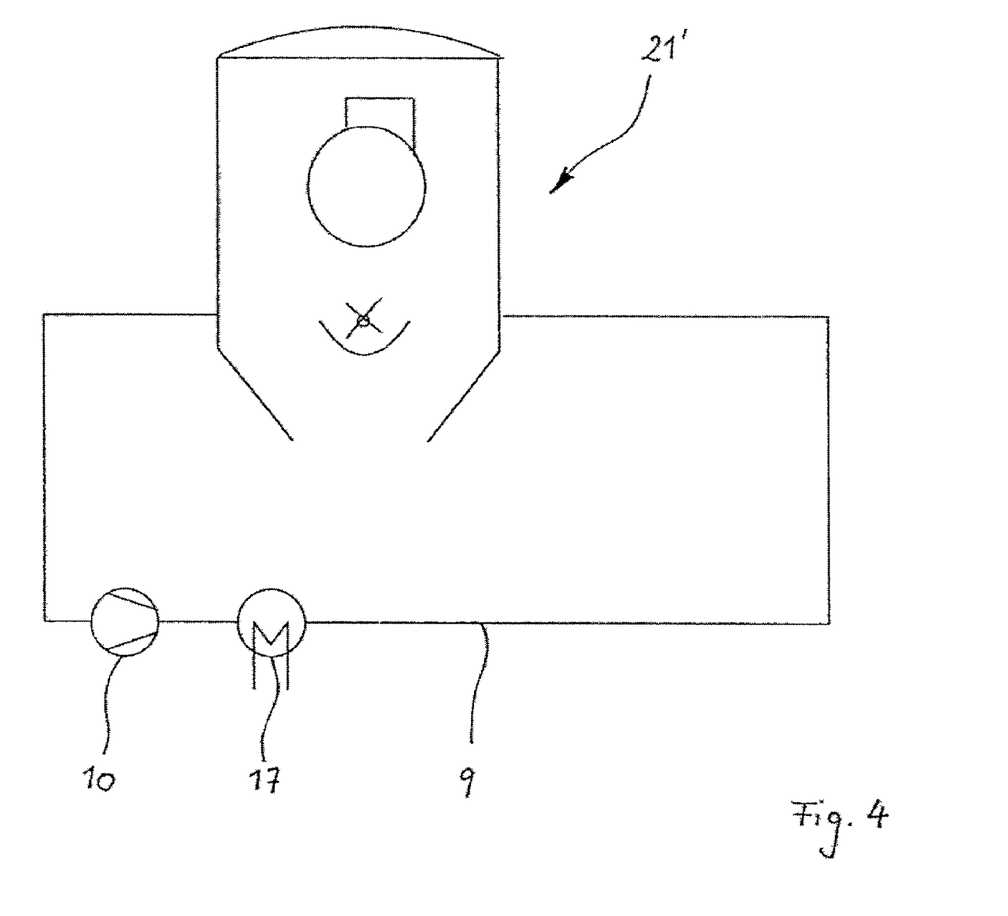
FIG. 4 shows a representation as in FIG. 3, but with a complete circulatory guidance of the cooling medium.

The apparatus 21' which is shown in FIG. 4 is essentially identical to the apparatus 21 as shown in FIG. 3 with the exception of the complete circulatory guidance of the nitrogen gas, which is why a heat exchanger 17 is disposed behind the compressor 10 within the return line 9, as in the apparatus 1' according to FIG. 2.

Figure 5:
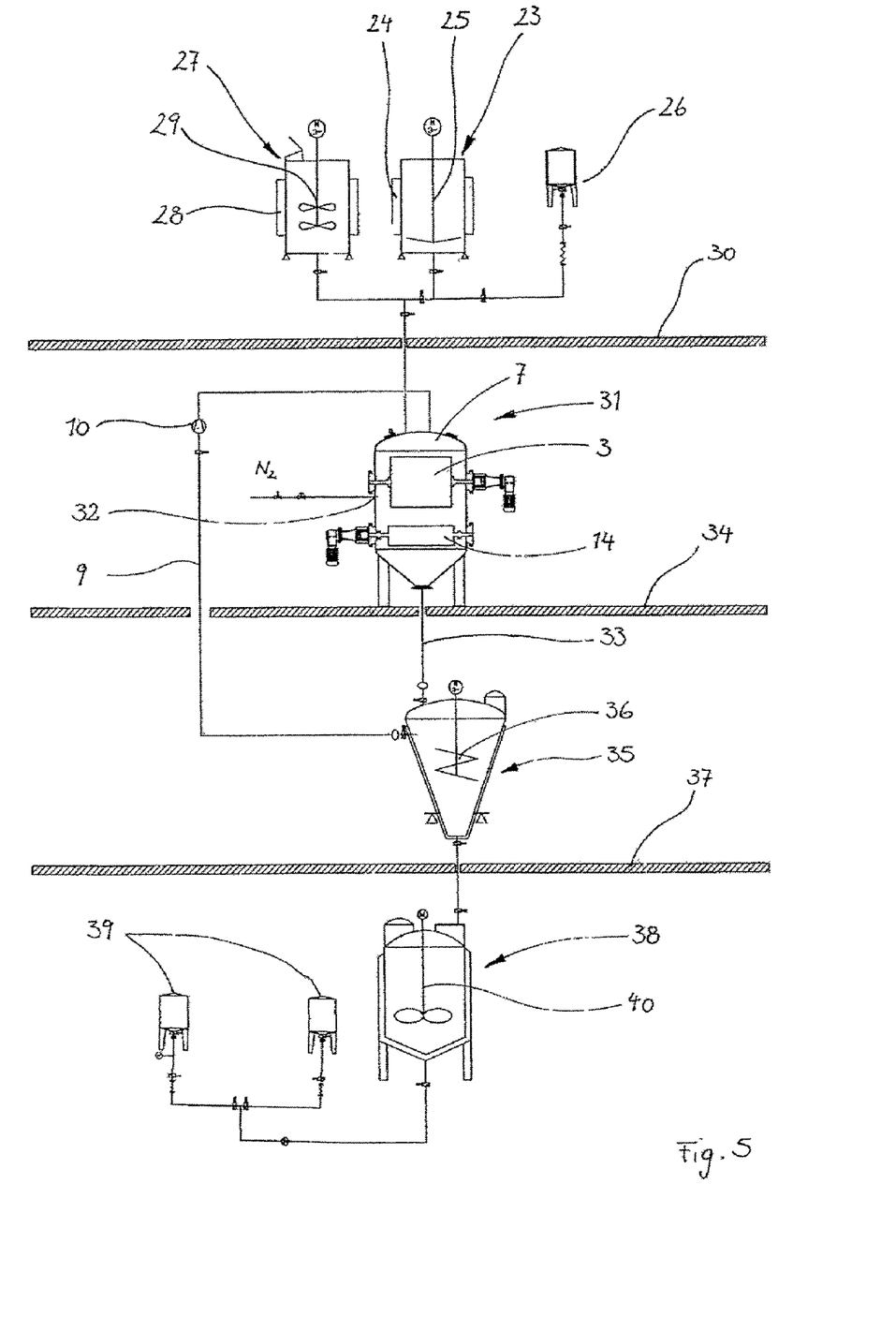
FIG. 5 shows a sectional view through a complete system for producing chocolate particles, including a sterilization device, an apparatus for producing particles, a buffer vessel and a mixing vessel.

FIG. 5 shows in a vertical sectional view the arrangement of a sterilization device 23, which concerns a boiling apparatus whose double insulation casing or jacket 24 is heated with steam. Steam is introduced in a finely dispersed form into the chocolate wit the help of a dissolver disk 25. The sterilization device concerns a pressure vessel because the sterilization occurs at a temperature of approx. 2 bars and a temperature of approx. 125° C. The aforementioned sterilization method is known from EP 0974275 A1. In order to enable the continuous operation of the forming of the chocolate particles which occurs after the sterilization that occurs batches, only a partial quantity is pumped into the sterilization device 23 from a reservoir 26. After the performed sterilization the sterilized chocolate is intermediately stored in a buffer vessel 27 which can be heated by means of a double jacket 28 and is further provided with a stirrer 29. The supply of an apparatus 31 for forming the particles occurs through the ceiling 30, which apparatus corresponds essentially in its arrangement to the apparatuses 1, 1' and 21,21' according to FIGS. 1 to 4. The apparatus 31 comprises a rotating cooling roller 3 and an optional cooling belt 14.

Cold nitrogen gas is conducted through the receptacle 7, which is arranged as a pressure vessel, in a co-current flow to the particle flow, with the gas being guided partly in a circulation with the help of a compressor 10 integrated in the return line 9. The supply of liquid nitrogen to compensate the increase in temperature occurs at location 32. The injection directed in the axial direction of the cooling roller 3 produces an axial flow through the interior space of the cooling roller 3 which is open at both sides so that a favorable convective heat transmission occurs at its interior jacket.

Following their comminution with the help of a comminution device (not shown), the particles leave the apparatus 31 together with the nitrogen gas through a conduit 33 which penetrates a further ceiling 34. Following gravity, the particles reach a funnel-like buffer receptacle 35 which is provided with a discharge worm 36. Since the flow cross section for particles and the nitrogen gas has expanded suddenly in the head zone of the buffer receptacle 35 and thus the flow speed has decreases dramatically, the nitrogen gas which is guided in a circulation is guided back by the return line 9 which also branches off in the head zone of the buffer receptacle 35. The portion of the nitrogen gas which is not guided in the circulation leaves the buffer receptacle at a location (not shown) as a waste gas.

There is mixing receptacle 38 which is separated from the buffer receptacle 35 by a further ceiling 37 and in which the chocolate particles are mixed by means of a stirring member with different assortments of a fruit preparation for example which are stored in storage vessels 39. The buffer receptacle 35 allows a continuous operation of the apparatus 31 and allows further the change between different assortments of fruit preparations for example which are mixed in the mixing receptacle 38 with the chocolate particles into an end product. Said end product consisting of the fruit preparation and the chocolate particles is used in yoghurts or sweet desserts for example.

The invention claimed is:

1. A method for producing particles of a foodstuff having a fat content of between 50% and 90%, a sugar content of not more than 20% and a water content of not more than 10%, the method comprising the steps of:
   providing the foodstuff in liquid form;
   applying the liquid form of the foodstuff to form a film onto a surface of a rotating cooling roller or a cooling belt;
   cooling the liquid form of the foodstuff so as to create at least partially hardened foodstuff;
   thereafter detaching the at least partly hardened foodstuff from the surface of the cooling roller or the cooling belt; and
   comminuting the at least partially hardened foodstuff to a desired particle size, wherein the method occurs in a sterilizable or pasteurizable vessel, and wherein a temperature of the surface of the cooling roller or the cooling belt is lower than 0° C. or a temperature of a cooling gas surrounding the cooling roller or cooling belt is lower than 0° C.

2. A method as claimed in claim 1, wherein the temperature of the surface of the cooling roller or cooling belt is lower than −20° C. or the temperature of the cooling gas surrounding the cooling roller or cooling belt is lower than −20° C.

3. A method as claimed in claim 2, wherein the temperature of the surface of the cooling roller or cooling belt is lower than −50° C. or the temperature of the cooling gas surrounding the cooling roller or cooling belt is lower than −50° C.

4. A method as claimed in claim 1, wherein the foodstuff is substantially crystallized at the detaching step.

5. A method as claimed in claim 1, wherein a layer thickness of the film applied to the cooling roller is set by changing a temperature of the liquid form of the foodstuff.

6. A method as claimed in claim 1, wherein the foodstuff comprises a content of cocoa butter of not less than 50%.

7. A method as claimed in claim 1, wherein the foodstuff is chocolate.

8. A method as claimed in claim 1, wherein the interior space of the vessel is flowed through by the cooling gas.

9. A method as claimed in claim 8, wherein nitrogen, carbon dioxide, argon or air is used as the cooling gas.

10. A method as claimed in claim 8, wherein the cooling gas is guided in a co-current flow or in a counter-flow to a direction of movement of the foodstuff on the surface of the rotating cooling roller or the cooling belt.

11. A method as claimed in claim 8, wherein the cooling gas is guided at least partly in circulation in the vessel.

12. A method as claimed in claim 2, wherein the layer thickness of the film applied to the cooling roller adjusted by changing a temperature of the liquid form of the foodstuff.

13. A method for producing particles of a foodstuff having a fat content of between 50% and 90%, a sugar content of not more than 20% and a water content of not more than 10%, the method comprising the steps of:

sterilizing the foodstuff;

causing the sterilized foodstuff to be in a liquid form;

applying the liquid form of the foodstuff so as to form an endless film on an exterior surface of a rotating cooling roller;

cooling the endless film until the liquid form of the foodstuff is at least partially hardened, wherein a supply of cooling fluid flows through an interior of the cooling roller;

detaching the at least partially hardened foodstuff from the exterior surface of the cooling roller;

comminuting the at least partially hardened foodstuff to a desired particle size.

14. The method as recited in claim 13, wherein a thickness of a layer of the film at the cooling roller is varied by changing a temperature of the liquid form of the foodstuff applied to the rotating cooling roller.

15. The method as recited in claim 13, wherein the steps of applying the liquid form of the foodstuff, cooling the endless film of the foodstuff, detaching the at least partially hardened foodstuff, and comminuting the at least partially hardened foodstuff each occurs in a sterilized vessel.

* * * * *